（12）United States Patent
Bruno et al.

(10) Patent No.: US 11,427,331 B2
(45) Date of Patent: Aug. 30, 2022

(54) FRESH AIR AND RECIRCULATION AIR MIXING OPTIMIZATION

(71) Applicant: Hamilton Sundstrand Corporation, Charlotte, NC (US)

(72) Inventors: Louis J. Bruno, Ellington, CT (US); Thomas M. Zywiak, Southwick, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 959 days.

(21) Appl. No.: 15/487,164

(22) Filed: Apr. 13, 2017

(65) Prior Publication Data

US 2018/0297709 A1  Oct. 18, 2018

(51) Int. Cl.
*B64D 13/02* (2006.01)
*B64D 13/06* (2006.01)

(52) U.S. Cl.
CPC .............. *B64D 13/02* (2013.01); *B64D 13/06* (2013.01); *B64D 2013/0618* (2013.01); *B64D 2013/0688* (2013.01); *Y02T 50/50* (2013.01)

(58) Field of Classification Search
CPC ............ B64D 13/02; B64D 2013/0688; B64D 2013/0618
USPC .......................................................... 454/76
See application file for complete search history.

(56) References Cited

U.S. PATENT DOCUMENTS

| 4,263,786 | A | 4/1981 | Eng |
| 5,299,763 | A | 4/1994 | Bescoby et al. |
| 5,461,882 | A | 10/1995 | Zywiak |
| 5,899,085 | A | 5/1999 | Williams |
| 7,805,947 | B2* | 10/2010 | Moulebhar ............... F02C 7/32 60/787 |
| 8,572,996 | B2 | 11/2013 | Dittmar et al. |
| 8,915,095 | B2 | 12/2014 | Bruno et al. |
| 9,169,024 | B2 | 10/2015 | Voinov |
| 9,254,920 | B2 | 2/2016 | Zhou et al. |
| 9,481,468 | B1 | 11/2016 | Schiff |

(Continued)

FOREIGN PATENT DOCUMENTS

| EP | 2597036 A2 | 5/2013 |
| EP | 2735510 A1 | 5/2014 |
| WO | 2016189421 A1 | 12/2016 |

OTHER PUBLICATIONS

Search Report dated Jun. 18, 2018, EP application No. 18167336.9, 9 pages.

(Continued)

*Primary Examiner* — Steven B McAllister
*Assistant Examiner* — Charles R Brawner
(74) *Attorney, Agent, or Firm* — Cantor Colburn LLP

(57) ABSTRACT

An aircraft is provided. The aircraft includes a pressurized volume and an air conditioning system. The air conditioning system operates in a first mode when the aircraft is performing high altitude operations and a second mode when the aircraft is performing low altitude operations. The first mode includes when a first medium, a second medium, and a third medium are mixed by the air conditioning system to produce a chamber ready medium. The second mode comprises when only the first medium and the second medium are mixed by the air conditioning system to produce the chamber ready medium. The air conditioning system provides the chamber ready medium to the pressurized volume.

18 Claims, 3 Drawing Sheets

(56) References Cited

U.S. PATENT DOCUMENTS

| | | | |
|---|---|---|---|
| 9,487,300 B2 | 11/2016 | Klimpel et al. | |
| 9,555,893 B2 | 1/2017 | Squier | |
| 9,669,936 B1 | 6/2017 | Fiterman et al. | |
| 2007/0113579 A1* | 5/2007 | Claeys | B64D 13/02 62/401 |
| 2008/0283663 A1 | 11/2008 | Space et al. | |
| 2010/0323601 A1* | 12/2010 | Cremers | B64D 13/06 454/76 |
| 2012/0285184 A1 | 11/2012 | Voinov | |
| 2013/0133348 A1* | 5/2013 | Squier | B64D 13/02 62/402 |
| 2016/0075435 A1 | 3/2016 | Stieger et al. | |
| 2016/0355270 A1 | 12/2016 | Bruno et al. | |
| 2018/0148182 A1* | 5/2018 | Fagundes | B64D 13/08 |
| 2018/0148184 A1* | 5/2018 | Golle | B64D 41/00 |

OTHER PUBLICATIONS

European Office Action; International Application No. 18167336.9-1010; International Filing Date: Apr. 13, 2018; dated Oct. 9, 2019; 8 pages.
Communication Pursuant to Artile 94(3) EPC; European Application No. 18167336.9-1010; International Filing Date: Apr. 13, 2018; dated Oct. 6, 2020; 4 pages.
European Search Report; European Application No. 22151056.3; dated Mar. 31, 2022; 9 pages.

* cited by examiner

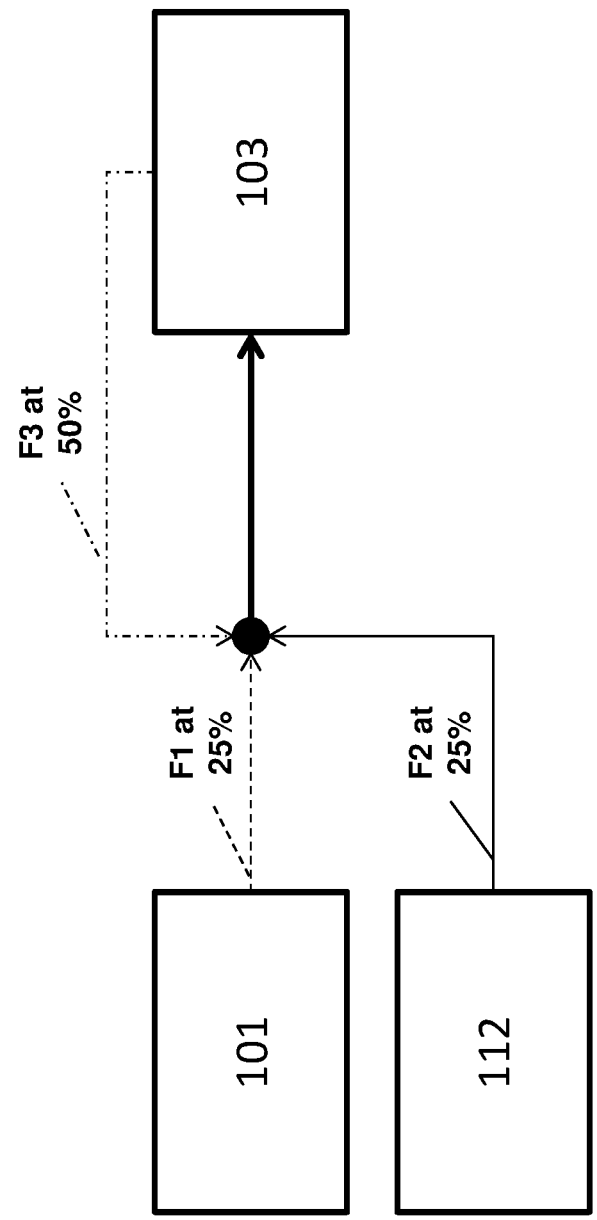

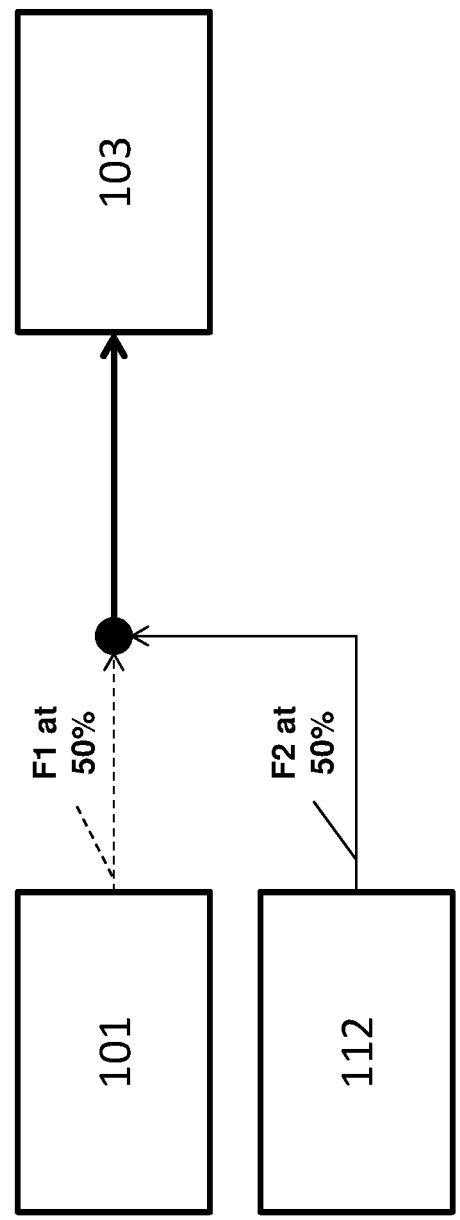

FRESH AIR AND RECIRCULATION AIR MIXING OPTIMIZATION

BACKGROUND

In general, a contemporary air condition system of an aircraft utilizes bleed air from an engine to manage cabin environmental conditions. When operating normally, the contemporary air condition system provides a combination of fresh air and recirculated air to a cabin and/or flight deck of the aircraft. The fresh air can be either engine bleed air or outside air that is compressed by compressors of the contemporary air condition system, while the recirculation air is air that comes from the cabin and/or flight deck and is "recirculated" back to the cabin.

BRIEF DESCRIPTION

According to one or more embodiments, an aircraft is provided. The aircraft includes a pressurized volume and an air conditioning system. The air conditioning system operates in a first mode when the aircraft is performing high altitude operations and a second mode when the aircraft is performing low altitude operations. The first mode includes when a first medium, a second medium, and a third medium are mixed by the air conditioning system to produce a chamber ready medium. The second mode comprises when only the first medium and the second medium are mixed by the air conditioning system to produce the chamber ready medium. The air conditioning system provides the chamber ready medium to the pressurized volume.

According to one or more embodiments, the high altitude operations can comprise high altitude cruise, climb, and descent flight conditions.

According to one or more embodiments, the high altitude cruise condition can comprise a cruise condition at greater than 4,500 meters.

According to one or more embodiments, the low altitude operations can comprise ground and low altitude flight conditions.

According to one or more embodiments, the low altitude flight condition can comprise a cruise condition at 4,500 meters or less.

According to one or more embodiments, the first medium, the second medium, and the third medium respectively can comprise bleed air, fresh outside air, and recirculated air.

According to one or more embodiments, the chamber ready air can comprise 25% of the first medium, 25% of the second medium, and 50% of the third medium during the first mode.

According to one or more embodiments, the chamber ready air can comprise 50% of the first medium and 50% of the second medium during the second mode.

According to one or more embodiments, a recirculation fan of the air conditioning system can be turned off during the second mode.

According to one or more embodiments, the air conditioning system can be configured to apply a ratio of a combination of the first and second mediums to the third medium from 50% to 100% for minimum power consumption.

According to an embodiment, air conditioning system is provided. The air conditioning system is configured to operate in a first mode during high altitude operations and a second mode during low altitude operations, wherein the first mode comprises when a bleed air, a fresh outside air, and a recirculated air are mixed by the air conditioning system to produce a chamber ready medium, and wherein the second mode comprises when only the bleed air and the fresh outside air are mixed by the air conditioning system to produce the chamber ready medium, wherein the air conditioning system provides the chamber ready medium to a pressurized volume.

According to one or more embodiments, the high altitude operations can comprise high altitude cruise, climb, and descent flight conditions.

According to one or more embodiments, the high altitude cruise condition can comprise a cruise condition at greater than 4,500 meters.

According to one or more embodiments, the low altitude operations can comprise ground and low altitude flight conditions.

According to one or more embodiments, the low altitude flight condition can comprise a cruise condition at 4,500 meters or less.

According to one or more embodiments, the chamber ready air can comprise 25% of the bleed air, 25% of the fresh outside air, and 50% of the recirculated air during the first mode.

According to one or more embodiments, the chamber ready air can comprise 50% of the bleed air and 50% of the fresh outside air during the second mode.

According to one or more embodiments, a recirculation fan of the air conditioning system can be turned off during the second mode.

According to one or more embodiments, the air conditioning system can be configured to apply a ratio of a combination of the bleed air and fresh outside air to the recirculation air from 50% to 100% for minimum power consumption.

According to one or more embodiments, an aircraft can comprise the air conditioning system.

BRIEF DESCRIPTION OF THE DRAWINGS

The following descriptions should not be considered limiting in any way. With reference to the accompanying drawings, like elements are numbered alike:

FIG. 2 depicts a high altitude mode of an environmental control system according to one or more embodiments; and FIG. 3 depicts a low altitude mode of an environmental control system according to one or more embodiments.

DETAILED DESCRIPTION

Figure 1:
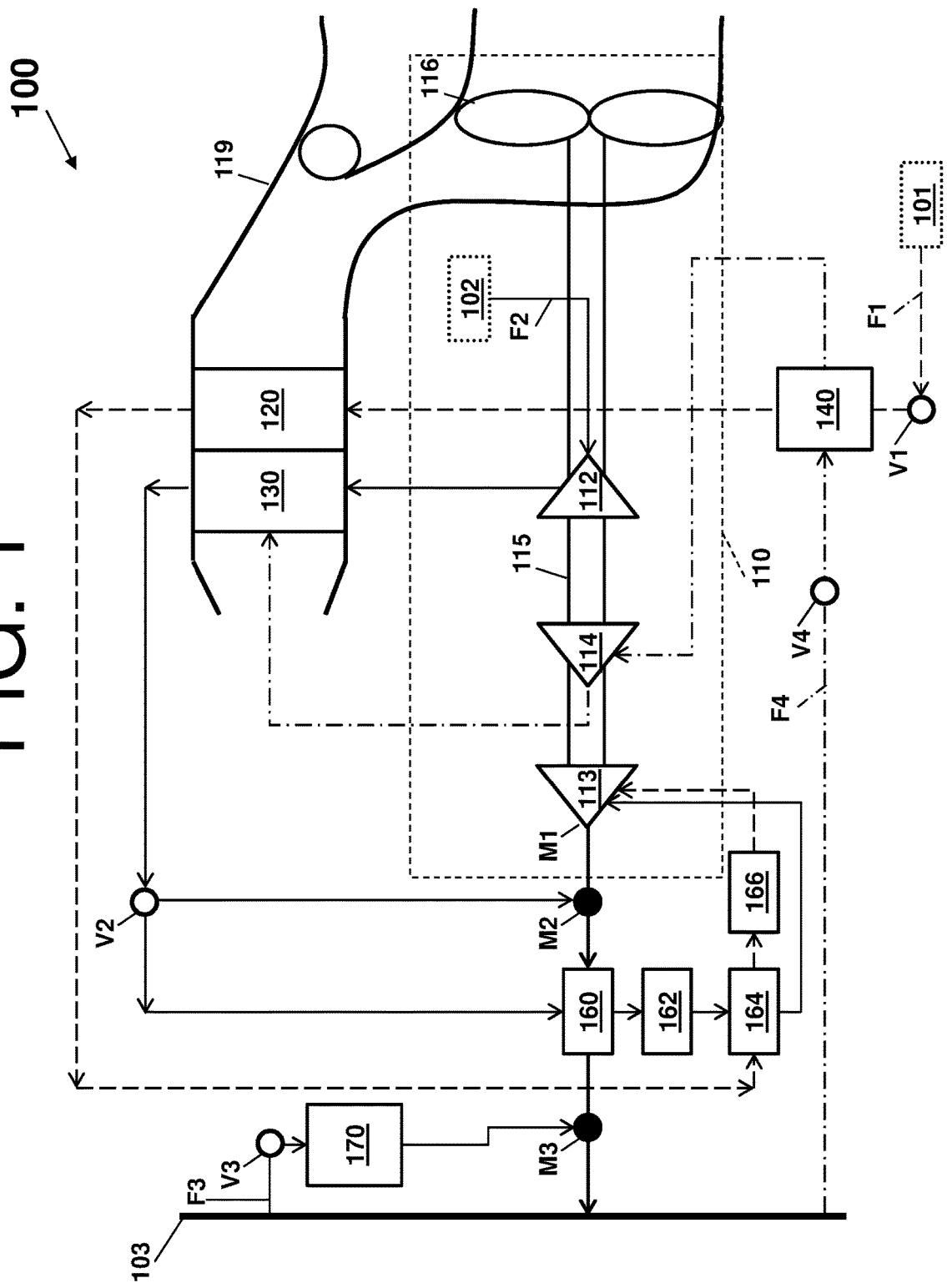
FIG. 1 depicts a schematic of an environmental control system according to one or more embodiments.

A detailed description of one or more embodiments of the disclosed apparatus and method are presented herein by way of exemplification and not limitation with reference to the FIGS.

Embodiments herein provide an environmental control system of an aircraft that mixes mediums from different sources and uses the different energy sources to power the environmental control system and to provide cabin pressurization and cooling at a high level of fuel burn efficiency. The medium can generally be air, while other examples include gases, liquids, fluidized solids, or slurries.

Turning to FIG. 1, an environmental control system 100 (herein referred to as a system 100) that receives mediums from on or more sources, such as a bleed air inlet 101, a fresh outside air inlet 102, and/or a chamber 103, and that provides a mixed form of the mediums to the chamber 103 is illustrated. The bleed air inlet 101 can represent a connection to a turbine engine or an auxiliary power unit of an aircraft. The fresh outside air inlet 102 can represent a connection to one or more scooping mechanisms of the aircraft, such as an impact scoop or a flush scoop. The chamber 103 can represent a pressurized volume, such as air within cabin of the aircraft or within cabin and flight deck of the aircraft.

The system 100 comprises a compressing device 110. As shown, the compressing device 110 comprises a compressor 112, a turbine 113, a turbine 114, a shaft 115, and a fan 116. The system 100 also comprises a heat exchanger 120 (e.g., a primary heat exchanger), a heat exchanger 130 (e.g., a secondary heat exchanger), a heat exchanger 140 (e.g., an outflow heat exchanger), a condenser 160, a water extractor 162, a condenser/reheater 164, water extractor 166, and a recirculation fan 170.

The compressing device 110 is a mechanical device that includes components for performing thermodynamic work on the mediums (e.g., extracts work from or works on a medium by raising and/or lowering pressure and by raising and/or lowering temperature). Examples of the compressing device 110 include an air cycle machine, a three-wheel air cycle machine, a four-wheel air cycle machine, etc.

The compressor 112 is a mechanical device that raises the pressure of a medium received from the bleed air inlet 101. Examples of compressor types include centrifugal, diagonal or mixed-flow, axial-flow, reciprocating, ionic liquid piston, rotary screw, rotary vane, scroll, diaphragm, air bubble, etc. Further, compressors can be driven by a motor (e.g., an electric motor) or the medium via the turbine 113 and/or the turbine 114.

The turbine 113 and the turbine 114 are mechanical devices that drive the compressor 112 and the fan 116 via the shaft 115. The fan 116 (e.g., a ram air fan) is a mechanical device that can force via push or pull methods air through the shell 119 across the heat exchangers 120 and 130 at a variable cooling to control temperatures. The shell 119 receives and directs a medium (such as ram air) through the system 100. In general, ram air is outside air used as a heat sink by the system 100. Note that the turbine 113 can be a duel entry turbine and include a plurality of inlet gas flow paths, such as an inner flow path and an outer flow path, to enable mixing of alternative medium flows at an exit of the turbine 113. The inner flow path can be a first diameter, and the outer flow path can be a second diameter.

The heat exchangers 120, 130, and 140 are devices built for efficient heat transfer from one medium to another. Examples of heat exchangers include double pipe, shell and tube, plate, plate and shell, adiabatic wheel, plate fin, pillow plate, and fluid heat exchangers.

The condenser 160 and the condenser/reheater 164 are particular types of heat exchangers. The water extractors 162 and 166 are mechanical devices that perform a process of taking water from the medium. Together, the condenser 160, the water extractors 162 and 166, and/or the condenser/reheater 164 can combine to be a high pressure water separation loop.

The recirculation fan 170 is mechanical devices that can recirculate from the chamber 103 via push or pull methods a medium back to the chamber 103.

The elements of the system 100 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system 100. Valves can be operated by actuators, such that flow rates of the medium in any portion of the system 100 can be regulated to a desired value.

As shown in FIG. 1, a first medium can flow along a path from the bleed air inlet 101 through the system 100 to the chamber 103, as indicated by dashed-lined arrows F1. A vale V1 (e.g., a mass flow control valve) controls a flow of the first medium from the bleed air inlet 101 to the system 100. The first medium can comprise air supplied to the system 100 from the turbine engine or the auxiliary power unit of the aircraft. In this way, the air can be said to be "bled" from the turbine engine or the auxiliary power unit. When the air is being provided by the turbine engine or the auxiliary power unit connected to the system 100, such as from the bleed air inlet 101, the air can be referred to as bleed air (e.g., pressurized air that comes from an engine or an auxiliary power unit). The temperature, humidity, and pressure of the bleed air vary widely depending upon a compressor stage and the revolutions per minute of the turbine engine.

A second medium can flow along a path from the fresh outside air inlet 102 through the system 100 to the chamber 103, as indicated by solid-lined arrows F2. A valve V2 controls whether a flow of the second medium flowing from the heat exchanger 130 bypasses the turbine 113 in accordance with a mode of the system 100. The second medium, which is being provided via the fresh outside air inlet 102, can be referred as fresh outside air.

A third medium can flow along a path from the chamber 103 through the recirculation fan 170 back to the chamber 103, as indicated by solid-lined arrows F2. A valve V3 controls whether a flow of the third medium enters the recirculation fan 170 in accordance with a mode of the system 100. The third medium, which is being provided from the chamber 103, can be referred as recirculation air as it returns to the chamber after being discharged.

A fourth medium can flow along a path from the chamber 103 through the system 100 to the shell 119, as indicated by dot-dashed-lined arrows F4. A valve V4 controls whether a flow of the fourth medium enters the heat exchanger 140 in accordance with a mode of the system 100. The fourth medium, which is being provided from the chamber 103, can be referred as chamber discharge air (also know as cabin discharge air. Note that in one or more embodiments, an exhaust from the system 100 (e.g., exhaust from turbine 114) can be released to ambient air through the shell 119 as shown or sent to another destination (e.g., an outlet or a cabin pressure control system).

The system 100 also includes mixing points M1, M2, and M3 where the first, second, and/or third mediums can mix in accordance with different modes of the system 100.

A combination of components of the system 100 can be referred to as an air conditioning pack or a pack. The pack can begin at a valve V1 and conclude at an exit of the condenser 160.

Operations of the system 100 will now be described in accordance with one or more embodiments. This system 100 is configured to mix a combined fresh air (e.g., bleed air and fresh outside air) and recirculation air to make chamber ready mixed air that is supplied to the chamber 103.

The system 100 receives high-pressure high-temperature bleed air (the first medium) from either the bleed air inlet 101, which enters the heat exchanger 120 (e.g., the first medium may bypass the heat exchanger 140). The heat exchanger 120 cools the high-pressure high-temperature bleed air to nearly ambient temperature to produce cool bleed air. This cool bleed air enters the condenser/reheater circuit (e.g., the condenser/reheater 164), where it is cooled by the fresh outside air (e.g., the second medium) to produce warm bleed air. The warm bleed air then enters the water extractor 166, where the condensed moisture is removed from the warm bleed air is removed to produce warm dry bleed air. The warm dry bleed air enters the turbine 113 through a nozzle, where it is expanded and work extracted. The work from the turbine 113 drives the compressor 112, which compresses the fresh outside air, and drives the fan 116, which is used to move air through the shell 119. The act of compressing the fresh outside air in the compressor 112, also, heats it.

The fresh outside air is compressed in the compressor 112 to produce compressed outside air. The compressed outside air enters the heat exchanger 130 and is cooled to nearly ambient temperature to produce cool compressed outside air. This cool compressed outside air (which can be considered at medium pressure, e.g., greater than an ambient pressure and lower than a high bleed pressure) enters the condenser 160, where it is cooled by mixed air from the turbine 116, and the water extractor 162, where the moisture in the air is removed, which results in dry cold outside air. The dry cold outside air then enters the condenser/reheater 164. The condenser/reheater 164 heats/reheats the dry cold outside air through a heat transfer from the cool bleed air, while cooling and condensing moisture from the cool bleed air to produce the warm bleed air. The condenser/reheater 164, thus, exhausts warm medium pressure air that then enters the turbine 113 through a second nozzle. The warm medium pressure air is expanded in the turbine 113 and work is extracted. The two air flows (e.g., the warm medium pressure air from the condenser/reheater 164 and the warm dry bleed air from the water extractor 166) are combined at an exit of the turbine 113 to form mixed fresh air. The exit of the turbine can be referred to as a first mixing point M1. The mixed fresh air then leaves the turbine 113, cools the cool compressed outside air leaving the heat exchanger 130 in the condenser, and continues to the chamber 130.

At a location downstream of the condenser 130, the mixed fresh air can be further mixed with recirculation air (e.g., the third medium from the chamber 103). This location, where the mixed fresh air is mixed with the recirculation air, can be referred to as a third mixing point M3. The third mixing point M3 produced chamber ready air from the mixed fresh air and the recirculation air. The chamber ready air is then sent to condition the chamber 103.

During airplane cruise segments, the chamber ready air entering the chamber 103 can be approximately 25% bleed air, 25% outside air, and 50% recirculated air. In this case, the recirculation fan 170 would remain on during normal airplane operation (e.g., taxi, take-off, climb, cruise, decent, and landing). Further, during ground operation, the chamber ready air is also provided to the chamber 103 at approximately 25% bleed air, 25% outside air, and 50% recirculated air. However, the process of bringing fresh outside air into the chamber 1-3 requires energy, which reduces the available energy available for conditioning the chamber 103.

For example, the system 100 can utilize energy in 112 lbs/min of bleed air to meet a cooling demand of the chamber 103 (note that this is a 28 lbs/min (20%) reduction in bleed flow from the contemporary air condition system). That is, in the process of making cooling air for the chamber 103, the bleed air is expanded through the turbine 113 and that energy is used to compress fresh outside air. The amount of fresh outside air driven by that energy is approximately 122 lbs/min. The combination of bleed air and fresh outside air equals 234 lbs/min 90% of the fresh air flow supplied to the chamber 103. This fresh air flow is adequate to provide all of the required flow to the chamber 103. Thus, the system 100 provides that the mixed fresh air (e.g., the warm medium pressure air from the condenser/reheater 164 and the warm dry bleed air from the water extractor 166) does not always need to be mixed with the recirculation air (e.g., at the third mixing point M3). In this way, the system 100 can operate in separate modes that exclude the mixing of the recirculation air at the third mixing point M3.

The system 100 will now be described in view of the above aircraft embodiment with respect to FIG. 2 and FIG. 3. FIG. 2 depicts a high altitude mode of the system 100 according to one or more embodiments. FIG. 3 depicts a low altitude mode of the system 100 according to one or more embodiments. Components of the system 100 have been reused for ease of explanation, by using the same identifiers, and are not re-introduced.

The high altitude mode of FIG. 2 comprises when an aircraft is performing high altitude operations. The high altitude operations comprise high altitude cruise, climb, and descent flight conditions (e.g., cruise conditions at greater than 4,500 meters (approximately 15,000 feet)). During the high altitude operations, the chamber ready air supplied to the chamber 103 is 50% fresh and 50% recirculation air. For instance, as shown in FIG. 3, the chamber ready air comprises approximately 25% bleed air, 25% outside air, and 50% recirculated air.

The low altitude mode of FIG. 3 comprises when an aircraft is performing low altitude operations. That is, the low altitude operations comprise ground and low altitude flight conditions (such as ground idle, taxi, take-off, and hold conditions at 4,500 meters or less). During the low altitude operations, the recirculation fan 170 is turned off and the chamber ready air supplied to the chamber 103 is 100% fresh air and 0% recirculation air. For instance, as shown in FIG. 3, the chamber ready air comprises approximately 50% bleed air and 50% outside air.

In addition, low altitude operations can occur within an envelope of extreme hot, humid to extreme cold, dry conditions, where an equivalent power consumption of the system 100 can be minimized with less than 100% fresh air supplied to the chamber but still higher than a 50% fresh air flow rate. An example according to one or more embodiments comprises, during a cold day, a combined 75% fresh air and 25% recirculated air flow being supplied to the chamber to achieve the required 100% total airflow. Note that a potential variability of a ratio of total fresh air to total recirculation air (e.g., combined fresh air and recirculation air) from 50% to 100% can achieve a minimum power consumption result for a variety of conditions that are not possible with contemporary air condition system.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft comprising:
    a pressurized volume; and
    an air conditioning system configured to operate in a first mode when the aircraft is performing high altitude operations and a second mode when the aircraft is performing low altitude operations, the air conditioning system including a recirculation fan and compressing device having a compressor and a turbine,
    wherein the first mode comprises when a first medium and a second medium are mixed by the air conditioning system at a first mixing point to form a fresh medium and the fresh medium and a third medium are mixed by the air conditioning system at a second mixing point, located downstream from the first mixing point relative to the flow of fresh medium, to produce a chamber ready medium, the recirculation fan is operational, the first medium and the second medium are provided to the turbine separately, wherein in the first mode, the first medium and the second medium are mixed within the air conditioning system at or downstream from an exit of the turbine, and the fresh medium is 50% of the chamber ready medium and the third medium is 50% of the chamber ready medium; and
    wherein the second mode comprises when only the first medium and the second medium are mixed by the air conditioning system to produce the chamber ready medium, the recirculation fan is non-operational in the second mode;
    wherein the air conditioning system provides the chamber ready medium to the pressurized volume.

2. The aircraft of claim 1, wherein the high altitude operations comprise high altitude cruise, climb, and descent flight conditions.

3. The aircraft of claim 2, wherein the high altitude cruise condition comprises a cruise condition at greater than 4,500 meters.

4. The aircraft of claim 1, wherein the low altitude operations comprise ground and low altitude flight conditions.

5. The aircraft of claim 4, wherein the low altitude flight condition comprises a cruise condition at 4,500 meters or less.

6. The aircraft of claim 1, wherein the first medium, the second medium, and the third medium respectively comprise bleed air, fresh outside air, and recirculated air.

7. The aircraft of claim 1, wherein the chamber ready medium comprises 25% of the first medium, 25% of the second medium, and 50% of the third medium during the first mode.

8. The aircraft of claim 1, wherein the chamber ready medium comprises 50% of the first medium and 50% of the second medium during the second mode.

9. The aircraft of claim 1, wherein the air conditioning system is configured to apply a ratio of a combination of the first and second mediums to the third medium from 50% to 100% for minimum power consumption.

10. An air conditioning system configured to operate in a first mode during high altitude operations and a second mode during low altitude operations,
    a recirculation fan; and
    a compressing device having a turbine;
    wherein the first mode comprises when a bleed air and an outside air are mixed by the air conditioning system at a first mixing point to form a fresh air, and the fresh air and a recirculated air are mixed by the air conditioning system at a second mixing point, located downstream from the first mixing point relative to the flow of fresh air, to produce a chamber ready medium, the recirculation fan is operational, and the bleed air and the fresh outside air are provided to the turbine separately, wherein the first medium and the second medium are mixed within the air conditioning system at or downstream from an exit of the turbine and the fresh air is 50% of the chamber ready medium and the recirculated air is 50% of the chamber ready medium; and
    wherein the second mode comprises when only the bleed air and the fresh outside air are mixed by the air conditioning system to produce the chamber ready medium, wherein in the second mode, the recirculation fan is non-operational;
    wherein the air conditioning system provides the chamber ready medium to a pressurized volume.

11. The air conditioning system of claim 10, wherein the high altitude operations comprise high altitude cruise, climb, and descent flight conditions.

12. The air conditioning system of claim 11, wherein the high altitude cruise condition comprises a cruise condition at greater than 4,500 meters.

13. The air conditioning system of claim 10, wherein the low altitude operations comprise ground and low altitude flight conditions.

14. The air conditioning system of claim 13, wherein the low altitude flight condition comprises a cruise condition at 4,500 meters or less.

15. The air conditioning system of claim 10, wherein the chamber ready medium comprises 25% of the bleed air, 25% of the fresh outside air, and 50% of the recirculated air during the first mode.

16. The air conditioning system of claim 10, wherein the chamber ready medium comprises 50% of the bleed air and 50% of the fresh outside air during the second mode.

17. The air conditioning system of claim 10, wherein the air conditioning system is configured to apply a ratio of a combination of the bleed air and fresh outside air to the recirculation air from 50% to 100% for minimum power consumption.

18. An aircraft comprising the air conditioning system of claim 10.

* * * * *